United States Patent
Chamley et al.

(10) Patent No.: US 10,242,183 B2
(45) Date of Patent: Mar. 26, 2019

(54) METHOD OF EXECUTING A PROGRAM BY A PROCESSOR AND ELECTRONIC ENTITY COMPRISING SUCH A PROCESSOR

(71) Applicant: OBERTHUR TECHNOLOGIES, Colombes (FR)

(72) Inventors: Olivier Chamley, Colombes (FR); Christophe Giraud, Colombes (FR)

(73) Assignee: IDEMA FRANCE, Colombes (FR)

( * ) Notice: Subject to any disclaimer, the term of this patent is extended or adjusted under 35 U.S.C. 154(b) by 215 days.

(21) Appl. No.: 14/965,203

(22) Filed: Dec. 10, 2015

(65) Prior Publication Data

US 2016/0171214 A1    Jun. 16, 2016

(30) Foreign Application Priority Data

Dec. 12, 2014 (FR) ...................... 14 62355

(51) Int. Cl.
  *G06F 21/54* (2013.01)
  *G06F 21/55* (2013.01)
  *G06F 21/62* (2013.01)

(52) U.S. Cl.
  CPC ........... *G06F 21/54* (2013.01); *G06F 21/556* (2013.01); *G06F 21/629* (2013.01); *G06F 2221/033* (2013.01)

(58) Field of Classification Search
  None
  See application file for complete search history.

(56) References Cited

U.S. PATENT DOCUMENTS

| | | | |
|---|---|---|---|
| 6,934,887 | B1 | 8/2005 | Baldischweiler |
| 2003/0051072 | A1* | 3/2003 | Burch, Jr. .............. G06F 9/54 719/328 |
| 2007/0106519 | A1 | 5/2007 | Giraud et al. |
| 2015/0220453 | A1* | 8/2015 | Heisswolf ........... G06F 12/1441 726/27 |

FOREIGN PATENT DOCUMENTS

| | | |
|---|---|---|
| EP | 1 538 509 A1 | 6/2005 |
| EP | 1 739 519 A1 | 1/2007 |

OTHER PUBLICATIONS

FR Search Report, dated Sep. 29, 2015, from corresponding FR application.

* cited by examiner

*Primary Examiner* — Amir Mehrmanesh
(74) *Attorney, Agent, or Firm* — Young & Thompson

(57) ABSTRACT

A method of executing a program by a processor, and an electronic entity including such a processor, the method includes the following steps:
  a calling program calling a subprogram and passing at least one parameter;
  the subprogram determining a return status indicator;
  the subprogram determining a return word by using a predetermined function to combine at least the return status indicator and the parameter;
  returning to the calling program with the determined return word as a result; and
  the calling program comparing the return word and a determined word determined by using the predetermined function to combine at least one possible value of the return status indicator and the parameter passed when calling the subprogram.

9 Claims, 1 Drawing Sheet

Figure 1:
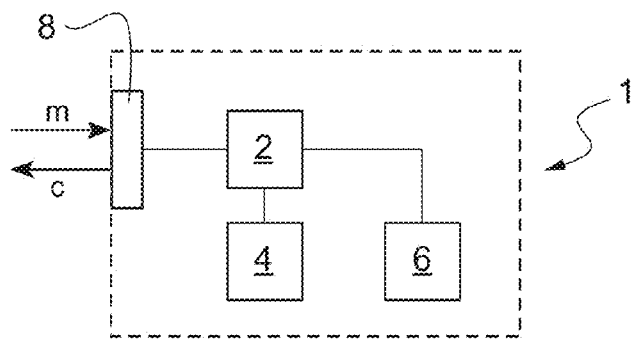

METHOD OF EXECUTING A PROGRAM BY A PROCESSOR AND ELECTRONIC ENTITY COMPRISING SUCH A PROCESSOR

TECHNICAL FIELD TO WHICH THE INVENTION RELATES

The present invention relates to providing protection against fault injection attacks.

The invention relates more particularly to a method of executing a program by a processor and to an electronic entity including such a processor.

The invention can be applied particularly advantageously when such a program calls a subprogram while passing data as parameters.

TECHNOLOGICAL BACKGROUND

When a processor is executing a program (referred to below as the "calling program"), it is common practice for at least one of the program instructions to call a subprogram (or called function) in order to perform certain functions (generally processing data) by using the subprogram.

A call to a subprogram generally involves passing data as parameters, which technique enables the calling program to communicate the data for processing to the subprogram.

Parameter passing is nevertheless a particular target for attacks by fault injection. If data that is passed in the form of parameters is changed in passing (e.g. as a result of an attacker physically disturbing the processor), that can be detected neither by the calling program (which issued correct data) nor by the subprogram (which has knowledge only of the modified data).

In order to combat attacks of this type, proposals have already been made, e.g. in Document EP 1 739 519, for the subprogram to produce an additional result that depends on the data it receives and to return the additional result to the calling program in order to verify the integrity of the data as processed.

OBJECT OF THE INVENTION

In this context, the present invention proposes a method of executing a program by a processor, the method comprising the following steps:

a calling program calling a subprogram and passing at least one parameter;
the subprogram determining a return status indicator;
the subprogram determining a return word by using a predetermined function to combine at least the return status indicator and the parameter;
returning to the calling program with the determined return word as a result; and
the calling program comparing the return word and a determined word determined by using the predetermined function to combine at least one possible value of the return status indicator and the parameter passed when calling the subprogram.

According to possible characteristics that are optional (and therefore not limiting):

said possible value is indicative of normal operation, in which case an attack processing step may, for example, be performed if a difference is detected between the return word and said determined word during the comparison step;

the attack processing comprises a step of writing blocking data in a rewritable non-volatile memory associated with the processor;
said possible value is indicative of an operation error, in which case an error processing step may be performed if the return word and said determined word are equal in the comparison step;
the parameter is an address for storing data used by the subprogram;
as a result of executing instructions of the subprogram, the processor performs data processing using the parameter; and
the processing of said data comprises applying an encryption algorithm to said data.

The invention also provides an electronic entity comprising a processor and a memory storing a program suitable for performing a method as proposed above when the program is executed by the processor.

DETAILED DESCRIPTION OF AN IMPLEMENTATION

The following description, made with reference to the accompanying drawing, which is given as a non-limiting example, shows clearly what the invention consists in and how it can be reduced to practice.

Figure 2:
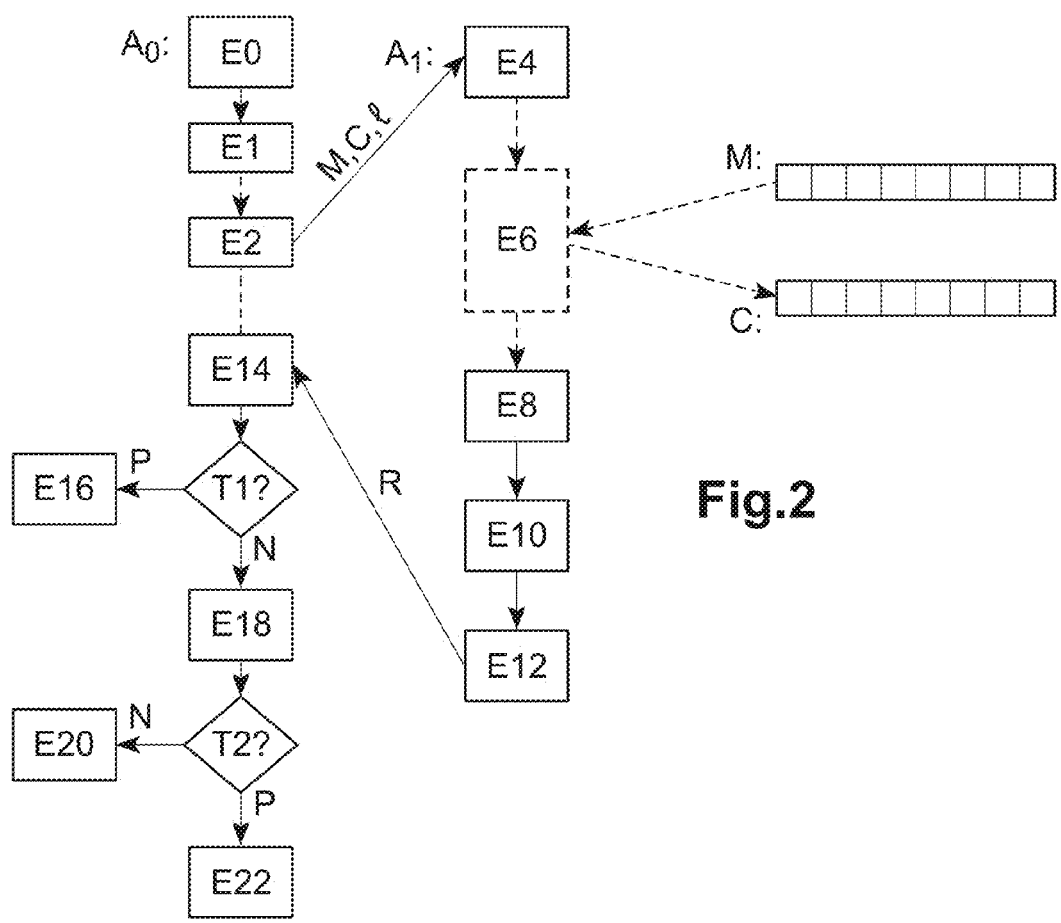

In the accompanying drawing:

FIG. 1 is a diagram of the main elements of an electronic entity within which the invention is performed; and FIG. 2 shows the main steps of the method performed by the electronic entity as a result of a microprocessor of the electronic entity executing program instructions.

FIG. 1 is a diagram of the main elements of an electronic entity 1 within which the invention is performed. By way of example, this electronic entity is an electronic module such as a smart card or secure element (SE), e.g. a secure microcontroller. In a variant, it may be a hand-held electronic device such as a communications terminal or an electronic passport or indeed a computer.

The electronic entity 1 comprises a processor (in this example a microprocessor 2), a random access memory (RAM) 4, and a rewritable non-volatile memory 6 (e.g. of the electrically erasable and programmable read only memory (EEPROM) type). The electronic entity 1 may optional also include a read only memory (ROM). The RAM 4 and the rewritable non-volatile memory 6 (and also the ROM, if any) are each connected to the microprocessor 2 so that the microprocessor 2 can read or write data in each of the memories.

One of the memories, e.g. the rewritable non-volatile memory 6, stores computer program instructions that enable the method that is described below with reference to FIG. 2 to be performed when the instructions are executed by the microprocessor 2.

By way of example, provision may be made for the instructions to be stored in the rewritable non-volatile memory 6 (so that they are retained even when the electronic entity is not electrically powered), and then loaded into the RAM 4 (e.g. during an initialization stage performed when the electronic entity starts operating) so as to be executed by the microprocessor 2.

Thus, and as shown diagrammatically in FIG. 2, provision is made during the operation of the electronic entity 1 for a calling program (or calling function) to be stored in the RAM 4 starting from an address $A_0$ in the RAM, and for a subprogram (or called function) to be stored in the RAM 4 starting from an address $A_1$.

The memories 4, 6 also store data for use when the microprocessor 2 is performing data processing methods, e.g. when performing the method described below with reference to FIG. 2.

For example, the rewritable non-volatile memory 6 stores a cryptographic key that is used in this example for encrypting a message, as explained below.

Furthermore, as also explained below, the RAM 4 stores data that is processed or produced during the methods that are described below, and in particular a message m (stored at an address M in the RAM 4), and an encrypted version c of the message m (the encrypted version c being stored at the address C in the RAM 4).

The electronic entity 1 may also include a communications interface 8 for communicating with external electronic devices. In the presently-described example where the electronic entity 1 is a smart card, the communications interface 8 comprises, by way of example, contacts that are flush with one of the faces of the smart card. In a variant, the communications interface 8 may be provided by a contactless communications module. In general, the communications interface 8 may be a wired or wireless module for communicating with an other electronic entity.

The microprocessor 2 can thus receive data (e.g. a message m) from the other electronic entity via the communications interface 8, and in response it can send data (e.g. an encrypted version c of the message m) to the other electronic entity via the communications interface 8.

FIG. 2 shows the main steps of a method performed by the electronic entity 1 as a result of the microprocessor 2 executing program instructions.

The method begins with a step E0 of receiving a message m via the communications interface 8 from another electronic entity, such as a smart card reader.

As shown diagrammatically in FIG. 2, step E0 is performed as a result of the microprocessor 2 executing instructions of the above-mentioned calling program that is stored in the RAM at address $A_0$. By way of example, these instructions may include an idle loop waiting for a command coming from the other electronic unit, which command may be in compliance with the ISO 7816 standard, for example.

Once the message is received, it is stored in the RAM 4 at an address M, as mentioned above (step E1).

After possible preprocessing (not shown), the microprocessor 2 then acts in a step E2 to make a call to the above-mentioned subprogram as a result of the microprocessor 2 executing a corresponding instruction of the calling program (a call instruction).

This call to the subprogram is accompanied with parameters that are passed thereto, in this example the address M when the received message m is stored, an address C to be used by the subprogram for storing the encrypted version c of the message m, and the length l (e.g. in bytes) of the message m.

By way of example, such a call instruction corresponds in the C language to a function call of the following type:

retval=encryptionFunction(message,encrypted,
    length);

where encryptionFunction is a function (or subprogram) defined as follows:

```
unsigned short encryptionFunction (
    unsigned char *message,
    unsigned char *encrypted,
    unsigned char length,
```

-continued

```
)
{
    // subprogram instructions stored at address A₁ //
    // see description below of steps E4 to E12 //
}.
```

By calling the subprogram stored at the address $A_1$, the microprocessor 2 acts in step E4 to execute instructions of the subprogram as stored starting from address $A_1$.

Executing certain instructions of the subprogram serves in particular to perform a step E6 of processing the received data (in this example the received message m) by using a cryptographic algorithm (in this case an encryption algorithm using the cryptographic key stored in the rewritable non-volatile memory 6, as mentioned above).

As shown diagrammatically in FIG. 2, step E6 involves in particular (as a result of the microprocessor 2 executing instructions of the subprogram as stored at the address $A_1$) performing operations of reading at least a portion of the message m stored at the address M (received as a parameter) with a length l (received as a parameter), cryptographic calculation operations using the read portion and at least a portion of the cryptographic key, and operations of writing at least a portion of the encrypted version c of the message (or encrypted message) that is stored at the address C (also received as a parameter).

The microprocessor 2 also acts in a step E8 (once more by executing instructions of the subprogram) to determine a return status indicator that is representative of the return status of the subprogram.

Such a return status indicator is determined by way of example on the basis of the data processed during the preceding steps, in particular during the step E6, and/or by verifying certain aspects of the operation of the electronic entity 1. Depending on its value, the return status indicator may indicate that the subprogram has run correctly or that there was an error in the running of the subprogram, possibly associated, under such circumstances, with an indicated error code.

By executing instructions of the subprogram, the microprocessor 2 then acts in a step E10 to determine a return word R by using a predetermined function to combine the return status indicator with at least some of the data passed as parameters, and in this example with all of the data passed as parameters, namely the address M for storing the message m, the address C for storing the encrypted version c, and the length l of the message m.

In the presently-described example, the return word is the sum of these various elements, namely the sum of the return status indicator plus the data passed as parameters, i.e. the sum of the return status indicator, of the address M for storing the message m, of the address C for storing the encryption version c, and the length l of the message m.

In a variant, the predetermined function used for combining the return status indicator and at least some of the data passed as parameters could make use of operators of types other than addition, for example subtraction, an exclusive-OR operation (XOR or Boolean sum) or a hashing function.

In a step E12, the microprocessor executes an instruction for returning to the calling program, and it returns the return word R. Such a return instruction terminates the subprogram (i.e. it constitutes the last instruction of the subprogram) and it causes the microprocessor 2 to execute the instruction of the calling program that immediately follows the call instruction (see step E2 above), i.e. it is the instruction stored in the RAM 4 immediately after the call instruction, thereby starting to perform a step E14 as described below.

In FIG. 2, steps E6, E8, E10, and E12 are shown as separate steps in order to clarify the description. It should nevertheless be observed that in practice certain steps may be grouped together or they may be performed in parallel.

In the context of the example given above in the C language, the steps E10 and E12 may, for example, be performed by means of the following line that is placed at the end of the above-described encryptionFunction function:

return((unsigned short)((unsigned short)message+
(unsigned short)encrypted+length+status))

where status is the return status indicator determined in step E8.

During step E14, as a result of execution returning to the calling program, the microprocessor 2 determines a first comparison value $V_1$ by using the predetermined function to combine an error value of the return status indicator with the values of data passed as parameters and used for determining the return word R in step E10, i.e. in this example, all of the data passed as parameters, namely the address M for storing the message m, the address C for storing the encrypted version c, and the length l of the message m.

As mentioned above, it should be observed that step E14 is performed by the calling program and that the data used for calculating the first comparison value $V_1$ is consequently the data passed as parameters by the calling program during the call of step E2; this data may thus differ from the values received as parameters passed by the subprogram, in particular in the event of there being an attack by fault injection during the call.

The microprocessor 2 then performs a test T1 for equality between the return word R returned by the subprogram in step E12 and the first comparison value $V_1$ as determined in step E14.

When the parameters are passed correctly in step E2, the equality test T1 is positive when the return status indicator determined in step E8 has the error value used in calculating the first comparison value $V_1$ in step E14. (The possibility of a problem in passing parameters is detected below in a test T2.)

Thus, when the equality test T1 has a positive result (arrow P), a step E16 is performed of processing the error signaled by the error value used in calculating the first comparison value $V_1$ in step E14. By way of example, such an error may be that the subprogram has found it impossible to read and/or write in the RAM 4 (during step E6); by way of example, under such circumstances, the error processing constitutes using the communications interface 8 to send an error message to the other electronic entity (reader).

When the equality test T2 has a negative result (arrow N), the microprocessor 2 acts in a step E18 to determine a second comparison value $V_2$ by using the predetermined function to combine a return status indicator that indicates normal operation (often specified by the value "OK") with the values of the data passed as parameters used for determining the return word R in step E10, i.e. in this example all of the data passed as parameters, namely the address M for storing the message m, the address C for storing the encrypted version c, and the length l of the message m.

As mentioned above for step E14, step E16 is performed by the calling program and the data used for calculating the second comparison value $V_2$ is consequently the data passed as parameters by the calling program during the call to step E2; this data may thus differ from the values received by the subprogram as passed parameters, in particular in the event of a fault injection attack during the call.

The microprocessor 2 then performs an equality test T2 between the return word R returned by the subprogram in step E12 and the second comparison value $V_2$ as determined in step E18.

When parameters are passed correctly in step E2 and the return status indicator determined in step E8 has a value indicating normal operation, the return word R and the second comparison value $V_2$ are equal since they have been determined using the same predetermined function and on the basis of the same data.

Thus, if the equality test T2 has a positive result (arrow P), then no problem has been detected and it is possible to proceed in step E22 with sending the encrypted version c of the message m via the communications interface 8 to the other electronic entity (in this example a smart card reader).

In contrast, if the equality test T2 has a negative result (arrow N), that means that the parameters have not been passed correctly (the data used for calculating the return word R in step E10 differs at least in part from the corresponding data used in the calling program), or else that the return status indicator determined in step E8 has a value other than that for normal operation (and in this example is also different from the error value used in step E14).

Under such circumstances, there thus exists a possibility that an attack has occurred in order to disturb the passing of parameters in step E2, and consequently, in the event of the equality test T2 giving a negative result, the method continues with a step E20 for processing an attack.

By way of example, the attack processing of step E20 may comprise writing blocking data (sometimes referred to as a "lock") in the rewritable non-volatile memory 6, and/or erasing at least a portion of the non-volatile memory, and/or reinitializing the microprocessor 2. For example, the electronic entity 1 may be designed in such a manner as to consult the rewritable non-volatile memory 6 on each occasion the microprocessor 2 is reinitialized and to interrupt its operation in the presence of said blocking data (generally at a predetermined location) in the rewritable non-volatile memory 6.

In a variant, the attack processing E20 may comprise writing a flag in the rewritable non-volatile memory 6 and/or modifying a value stored in the rewritable non-volatile memory 6. The electronic entity 1 may then be designed to consult this flag or this value, and under certain conditions (e.g. exceeding a threshold by the above-specified value), to write blocking data such as the above-mentioned data in the rewritable non-volatile memory 6.

In the context of the above example in the C programming language, the step E18, the test T2, and the step E20 may correspond for example to the calling program having instructions as shown below:

if(retval !=(unsigned short) (unsigned short)message
+(unsigned short)encrypted+length+OK) secu-
rityAction( );

where retval is the return word R determined by the encryptionFunction function call as explained above (see step E2), OK is the value of the operation indicator indicating normal operation and securityAction( ) is an attack processing function, such as that described above (step E20).

As explained above, the test T1 serves to verify whether the return status indicator as determined by the subprogram in step E8 has a certain error value (value used in step E14) in order to perform processing that is specific to that type of error. The test T2 serves mainly to detect a problem with passing parameters in step E2.

In a possible variant, a plurality of comparison values may be calculated as in step E14, while using a different error value on each occasion for the return status indicator, and corresponding equality tests may be performed in order to perform specific error processing for each type of error associated with an error value.

In another possible variant, the steps E14 and E16 and the test T1 are not performed. Under such circumstances, the method proceeds directly to step E18 on returning to the calling program. In this variant, the method proceeds to the attack processing step E20 as soon as data has not been passed correctly as parameters to the step E2 or as soon as the return status indicator does not indicate normal operation. In other words, under such circumstances, no distinction is made between the processing of attacks and of errors.

The invention claimed is:

1. A method of executing a program by a processor, the method comprising the following steps:
   during execution of a calling program, calling a subprogram and passing at least one parameter such that said subprogram receives said at least one parameter;
   the subprogram determining a return status indicator;
   the subprogram determining a return word by using a predetermined function to combine at least the return status indicator and the received at least one parameter;
   executing a return instruction of the subprogram, thereby returning to the calling program with the determined return word as a result;
   executing the calling program to determine a comparison word by using the predetermined function to combine at least a possible value of the return status indicator and the at least one parameter passed when calling the subprogram; and
   executing the calling program to compare the return word and the comparison word,
   wherein said possible value is indicative of normal operation, and
   wherein a difference is detected between the return word and the comparison word during the step of executing the calling program to compare the return word and the comparison word, and based on the detected difference, an attack processing step is performed.

2. The method according to claim 1, wherein the attack processing comprises a step of writing blocking data in a rewritable non-volatile memory associated with the processor.

3. The method according to claim 1, wherein the parameter is an address for storing data used by the subprogram.

4. The method according to claim 1, wherein, as a result of executing instructions of the subprogram, the processor performs data processing using the parameter.

5. The method according to claim 4, wherein the processing of said data comprises applying an encryption algorithm to said data.

6. A method of executing a program by a processor, the method comprising the following steps:
   during execution of a calling program, calling a subprogram and passing at least one parameter such that said subprogram receives said at least one parameter;
   the subprogram determining a return status indicator;
   the subprogram determining a return word by using a predetermined function to combine at least the return status indicator and the received at least one parameter;
   executing a return instruction of the subprogram, thereby returning to the calling program with the determined return word as a result;
   executing the calling program to determine a comparison word by using the predetermined function to combine at least a possible value of the return status indicator and the at least one parameter passed when calling the subprogram; and
   executing the calling program to compare the return word and the comparison word,
   wherein said possible value is indicative of an operation error, and
   wherein the return word and the comparison word are determined to be equal in the step of executing the calling program to compare the return word and the comparison word, and based on the return word and comparison word being determined to be equal, an error processing step is performed.

7. The method according to claim 6, wherein the parameter is an address for storing data used by the subprogram.

8. A method of executing a program by a processor, the method comprising the following steps:
   during execution of a calling program, calling a subprogram and passing at least one parameter such that said subprogram receives said at least one parameter;
   the subprogram determining a return status indicator;
   the subprogram determining a return word by using a predetermined function to combine at least the return status indicator and the received at least one parameter;
   executing a return instruction of the subprogram, thereby returning to the calling program with the determined return word as a result;
   executing the calling program to determine a comparison word by using the predetermined function to combine at least a possible value of the return status indicator and the at least one parameter passed when calling the subprogram; and
   executing the calling program to compare the return word and the comparison word,
   wherein, as a result of executing instructions of the subprogram, the processor performs data processing using the parameter, and
   wherein the processing of said data comprises applying an encryption algorithm to said data.

9. The method according to claim 8, wherein the parameter is an address for storing data used by the subprogram.

* * * * *